UNITED STATES PATENT OFFICE.

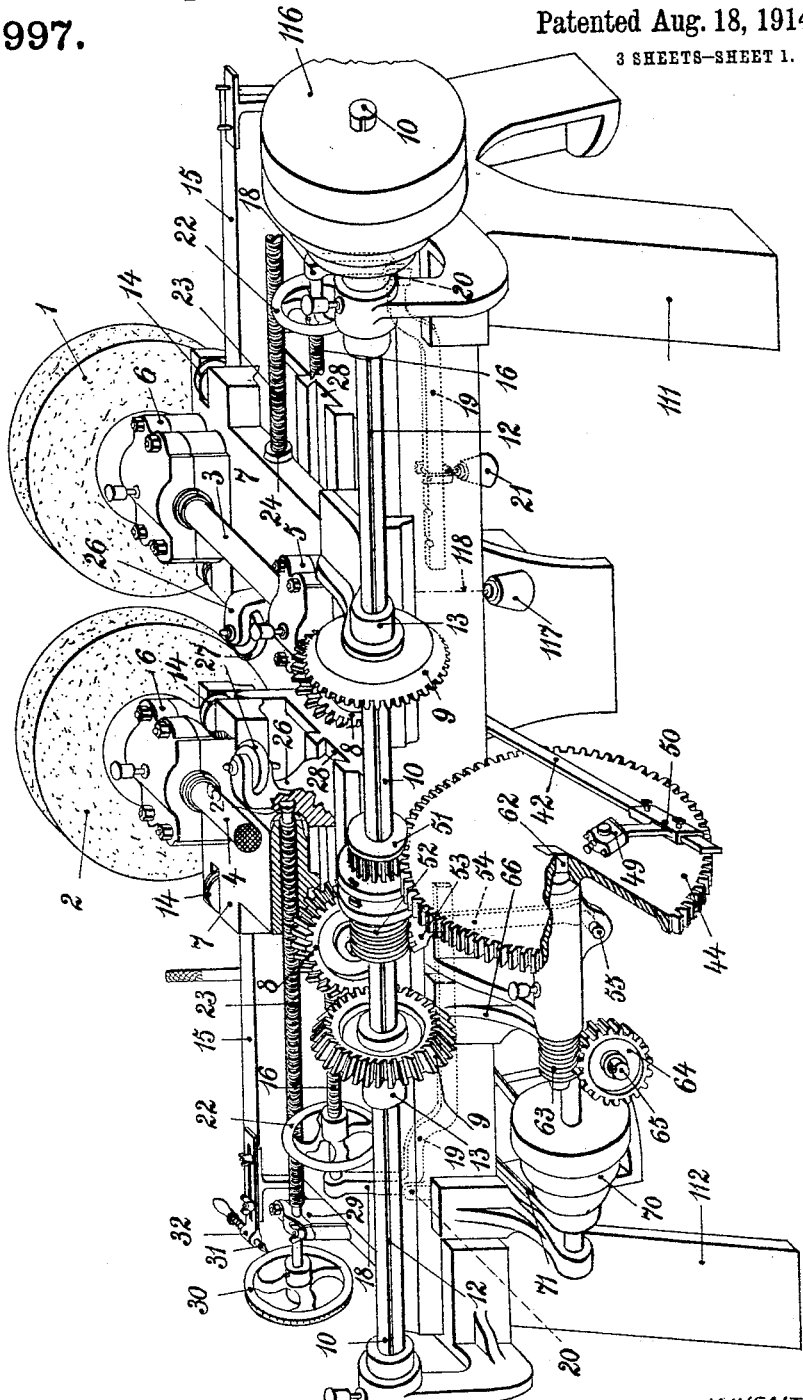

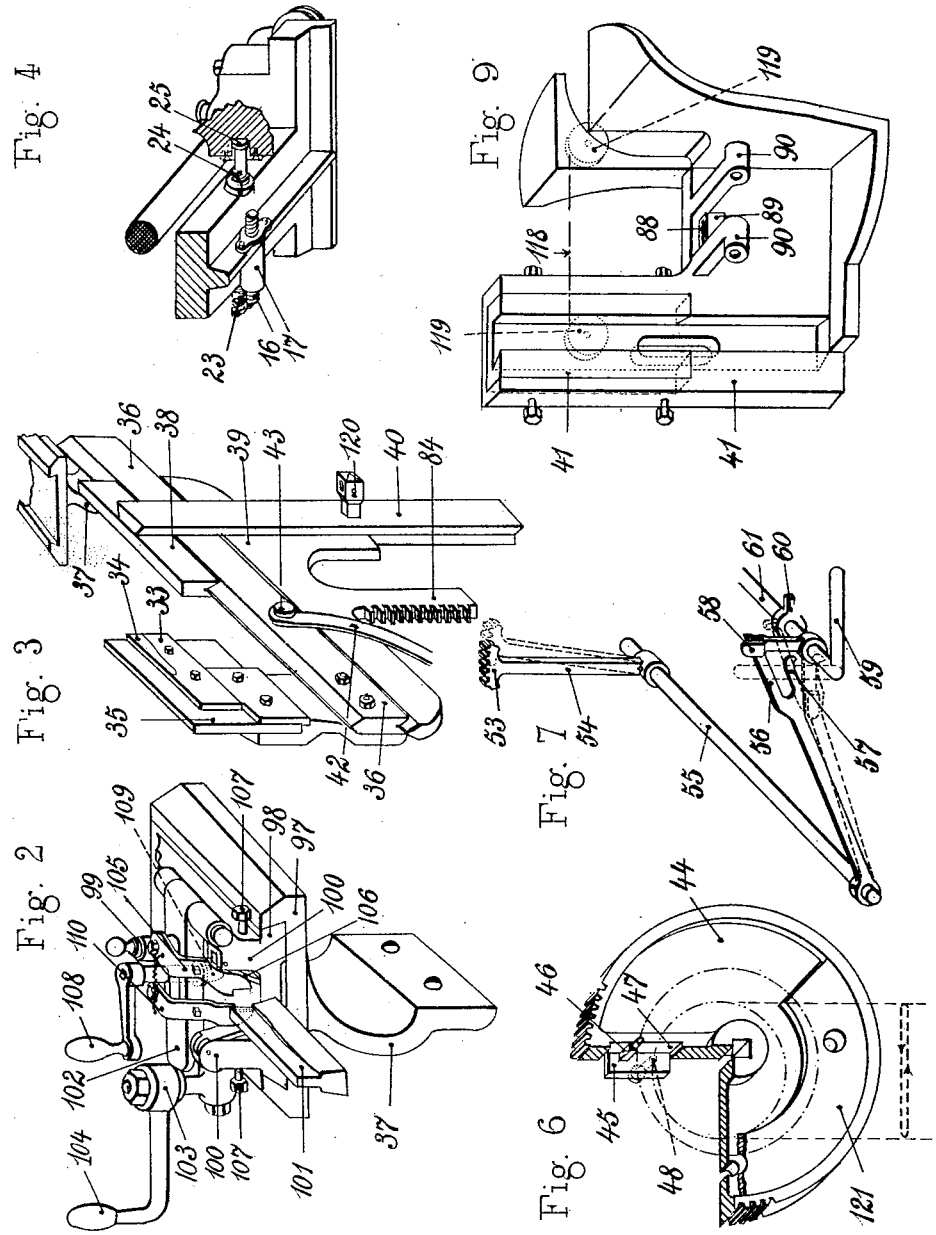

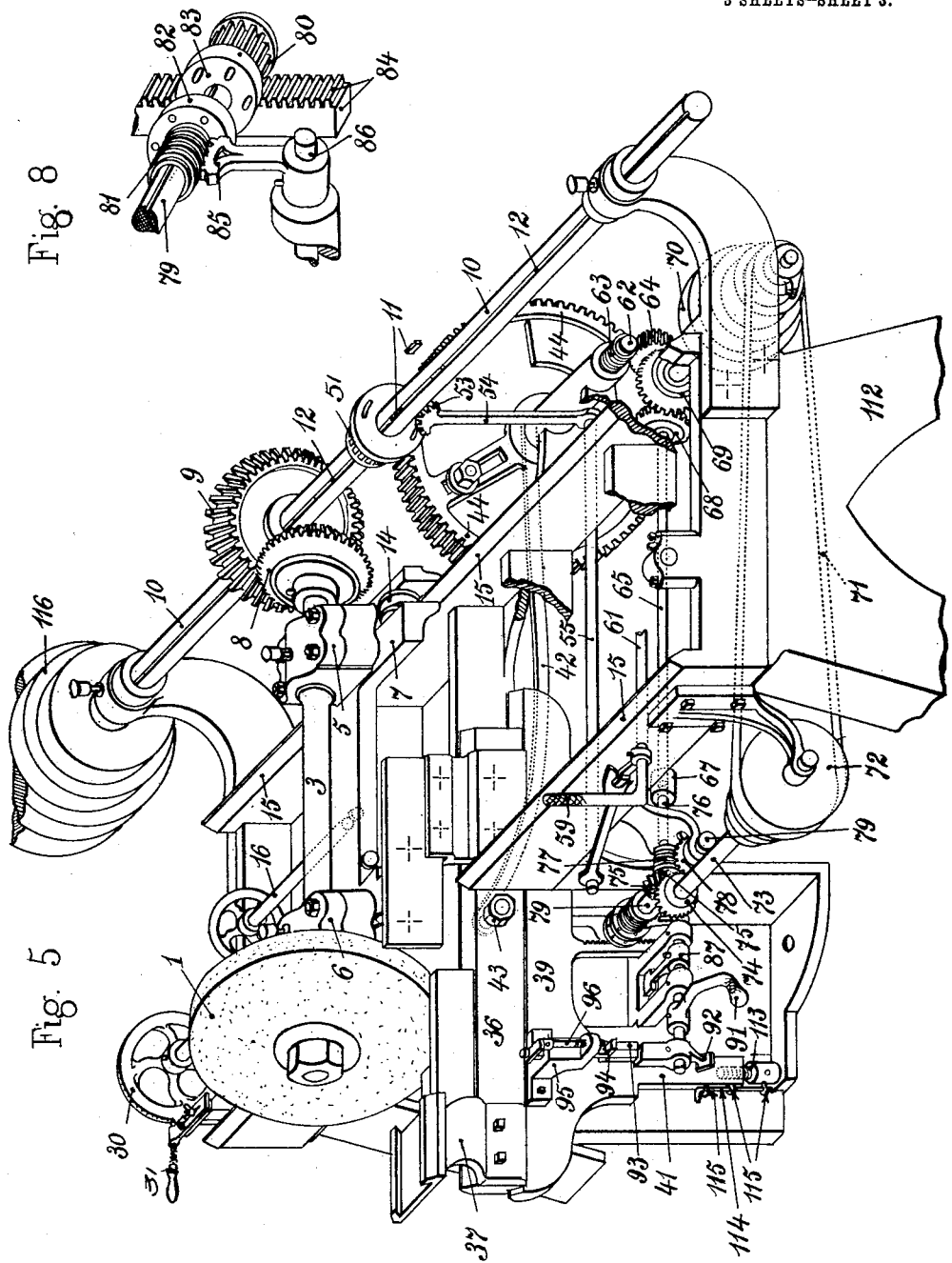

PIERRE PEROGNAT, OF THIERS, FRANCE.

MACHINE FOR GRINDING ROUGH-FORGED BLADES OF KNIVES AND OTHER CUTTING INSTRUMENTS.

1,107,997.  Specification of Letters Patent. Patented Aug. 18, 1914.

Application filed April 10, 1913. Serial No. 760,262.

*To all whom it may concern:*

Be it known that I, PIERRE PEROGNAT, a citizen of the French Republic, of Thiers, Puy-de-Dôme, France, have invented certain new and useful Improvements in and Relating to Machines for Grinding Rough-Forged Blades of Knives and other Cutting Instruments, of which the following is a complete specification.

This invention has for its object to provide a machine for grinding the rough forged blades of knives and other cutting instruments however irregular their shape and whatever their dimensions.

For the purpose of facilitating the understanding of the following description it may be stated here briefly that the machine consists essentially of two grindstones or grinding wheels rotating with their adjacent faces in opposite directions and between which two blades to be ground of the same shape are mounted on a common support and are adapted to be moved rectilinearly and horizontally to an extent equal to the length of the blades, in combination with an ascending movement equal in extent to the width of the blades to be ground, this ascending movement being followed automatically by a sudden drop at the end of the grinding operation.

In the accompanying drawings:—Figure 1 is a rear view of the general arrangement of the machine, certain parts of the same having been removed for the sake of clearness. Fig. 2 is a view of a device hereinafter referred to as the blade clamping device. Fig. 3 is a view of the slide carrying the blade clamping device shown in Fig. 2. Fig. 4 is a detail perspective of the slide adjusting mechanism. Fig. 5 is a front view of the machine taken slightly from one side thereof, parts being omitted. Fig. 6 shows a special form of eccentric with which the machine is provided. Fig. 7 is a detail perspective view of a sleeve operating lever mechanism. Fig. 8 is a detail perspective view of a clutch and its operating means. Fig. 9 shows a vertical slide for guidance in the ascending movement of the blades.

Two grindstones 1 and 2 arranged facing each other in one and the same plane as shown in Fig. 1, are mounted in an overhung manner by suitable means on the ends of two parallel shafts 3 and 4. Each of these shafts 3 and 4 rotates in bearings 5, 6 cast in one with their respective slides 7, 7. On that end of each shaft which is farthest from the grindstones 1 and 2 there is keyed a bevel pinion 8; these pinions 8 mesh with wheels 9 mounted on a common shaft 10. These wheels 9 share the rotation of the shaft 10 while at the same time they are movable along the said shaft by means of a flat stud 11 shown in Fig. 5, fixed in the hub of each wheel 9 and adapted to slide in a longitudinal groove 12 in the shaft 10. The wheels 9 are held in contact with the pinions 8 by a sleeve 13 fixed to each slide. Each slide 7 is supported by four grooved rollers 14 running on rails 15 provided on the framing of the machine.

The position of each slide 7 is adjusted by means of two screw spindles of which one, 16, works in a nut 17 (Fig. 4) fixed under the said slide and bears at its other end against the end of a bell crank lever 18, 19, fulcrumed on an axle 20 fixed to the framing. The arm 19 of this lever carries at its end a counterweight 21. This mechanism is designed to exert upon each slide 7 a constant pressure which can be regulated by means of a hand wheel 22, and which has tendency to bring the grindstones into contact with each other. The slide however follows this pressure only to the extent allowed it by another screw 23 which works in a nut 24 situated in the thickness of the slide and ends in a stop collar 25 (Fig. 4) fixed in a bracket 26. The latter carries a roller 27 having a function hereinafter described. The base of the bracket 26 is of trapezoidal cross section and is adapted to slide freely but without play in a slideway 28 fixed to the framing by two cross members whose attachments are visible in Fig. 5. At the rear is the stop collar 25 of Fig. 4 which receives and holds the end of the screw 23. This screw is guided at its other end in a bearing 29 (Fig. 1) where it carries outside the framing a handwheel 30 which is provided at its periphery with teeth in which engage the end of a spring pressed pin 31 mounted on a slide 32 for the purpose of enabling the hand wheel 30 to be stopped and held in any desired position.

It is to be understood that for each grindstone there is provided a set of parts similar to the set hereinbefore described, the said parts being mounted symmetrically to a vertical plane situated at equal distances from the axis of each grindstone. Similar parts are indicated by the same reference numerals.

Each roller 27 bears against a steel plate or guide 33 (Fig. 3) in the thickness of which there is formed a recess 34 of the shape and volume of half a knife blade. This guide is fixed on an iron plate 35 fixed to a slide 36. The latter consists of a straight edge of cast iron to the respective ends of which are bolted the plate 35 and the support 37 (Fig. 2) of the blade clamping device. It is adapted to slide with slight friction between two horizontal guides 38, 39 of an upright 40 (Fig. 3) fixed in a slideway 41 (Figs. 5 and 9). The slide 36 is moved horizontally by a connecting rod 42 attached at one end to the pin 43 of the slide 36 and at its other end to a toothed wheel 44 by means of a special eccentric shown in Fig. 6, which is constructed as follows: A crank 45 has one of its axes 46 fitted in a slot 47 formed along the radius of the wheel 44, while the other axis 48 supports a bearing 49 (Fig. 1) which is fixed to a socket 50 movable along the connecting rod 42. The wheel 44 is actuated by a pinion 51 which is loose on the shaft 10 and is driven by a sleeve 52 revolving with the shaft 10 but capable of sliding along the latter. This longitudinal movement of the sleeve 52 is due to a toothed sector 53 ending in a lever 54 keyed on a shaft 55. A two-armed lever 56—57 causes this shaft 55 to rotate when it is raised by a fork 58 fixed to a lever 59. Fig. 7 shows in full lines the position of engagement and in dotted lines the disengaged position. A spur 60 fixed on the shaft 61 of the lever 59, prevents the lever 58 from escaping from the fork by bearing on a stop (not shown) situated inside the frame (Fig. 7). The wheel 44 is fixed in an overhung manner on one end of a shaft 62 terminating at its other end in an endless screw 63 which drives a wheel 64 keyed on a shaft 65 held by a bracket 66 and a collar 67 (Fig. 5). This shaft 65 carries a bevel pinion 68 gearing with another pinion 69 which drives a four-step pulley 70. A belt 71 transmits the motion to a counter pulley 72 on a shaft 73 and thence to a bevel pinion 74. This pinion 74 gears with another pulley 75 keyed on the end of a shaft 76 terminating in the collar 67 where the shaft 65 likewise ends. An endless screw 77 keyed behind the pinion 75, drives the toothed wheel 78 that drives the shaft 79. This shaft 79 carries a loose pinion 80 (Fig. 8) and a sleeve 81 mounted on the shaft 79 by means of a stud which allows it to rotate with the said shaft, and also of sliding along it. A perforated disk 82 fixed to the sleeve 81, acts as a clutch for coupling the latter to a disk with pins 83 fixed to the pinion 80. The pinion 80 gears with a rack 84 (Fig. 8) fixed vertically to the part 39 (Fig. 3). Driving takes place when the sleeve 81 is engaged with the pinion 80 by the action of a toothed sector 85 keyed on a shaft 86 (Fig. 8). This shaft 86 also supports a lug 87 that bears upon a block of rubbers 88 (Fig. 9) fixed in a box 89 situated between the two brackets 90 which guide the shaft 86. An operating lever 91 and another lug 92 bearing against the slideway 41 for the purpose of limiting the return of the sector 85. The lug 92 ends in a square rod 93 similar to another rod 94 which is guided by a bracket 95 fixed to the upright of the part 39. The position of the rod 94 is determined by a screw 96.

The blade-clamping device (Fig. 2) consists of a table plate 97 bolted on the slide 36 which serves as a slideway for another table plate 98. These two parts are fixed to each other by means of a pin 99. Between the two raised ends 100 of the table plate 98 there is fixed a support 101 which passes between the grindstones for the purpose of supporting on both sides a blade to be ground. These blades rest on a shoulder which is shaped accurately thereto so that the machine must be provided with as many supports 101 as there are blades of different shapes to be ground. When the blades are in position, a clamping plate 102 is forced down and fixed by a snail-shaped ledge formed on the inner face of the head 103 of an operating crank-handle 104. This plate 102 has two claws 105 of special shape; bear in their descent upon sloping ledges 106 whose slope is regulated by means of bolts 107 whereby the two tangs of the positioned blades are brought nearer together. By means of a crank-handle 108 a cone 109 is then forced between the two tangs so as to cause the blades to bear very accurately against the support 101. A light coiled spring 110 keeps the two claws 105 apart so that they shall never fail to clamp the tangs. The framing of the machine consists of a kind of open-bottomed rectangular box bolted to two trestles 111, 112, all of cast iron. Four cross pieces serve to consolidate the box and also support the slideways of the two roller-bearing brackets 26. The long sides of the box are tapered at their upper edges in the form of an A so as to form the rails 15 for the rollers 14 of the grindstone slides 7. The rail 15 on the slide nearest the grindstones has a central gap for the passage of the slide 36; this weakened part is supported by suitable means. Brackets and chairs of suitable shapes fixed to the framing serve to carry the various shafts.

To get the machine ready to start:—First the guides 34 (Fig. 3), and then the support 101 (Fig. 2) are placed in position. Then three preliminary operations are effected. Namely, the adjustment of the height of the blade-clamping device, the adjustment of the horizontal travel of the slide carrying the blade-clamping device, and finally, the adjustment of the extent of the rising movement of the said slide. The adjustment of the height of the blade-clamping device is effected by means of the screw 113 (Fig. 5) fixed to the lower part of the slideway 41. This screw 113 is rotated by means of a spike 114 which is inserted in holes provided for this purpose in the head of the screw. When the adjustment as to height has been effected, the spike 114 is replaced by passing it in loops 115 provided on the side of the slideway 41 as well as on the head of the screw 113. This arrangement serves also as a preventive against the adjustment coming undone. At this moment the blades should be at the lowest point of their travel in contact with the grindstones, and the guide rollers 27 should be in contact with the largest cavity of the guides 34 (Fig. 3). For the purpose of adjusting the extent of the horizontal movement of the slide 36, that is to say, of the blades, the eccentric (Fig. 6) must be adjusted so that it has a radius equal to or slightly longer than half the length of the blades. During this operation the slide 50 (Fig. 1) is loosened so as to allow the connecting rod 42 to slide freely therein. When once the eccentric has been adjusted the slide 50 is tightened again. The adjustment of the extent of the ascending movement of the slide 36 is effected by regulating the length of contact between the rods 94 and 93 which slide one in front of the other. For this purpose the pinion 80 must be engaged so as to cause the rod 94 to pass in front of the rod 93. Then the length of contact is made equal to the width of the blades by means of the screw 96. When once these adjustments have been made, the machine is thereby adjusted for grinding an indefinite number of the same shaped blades.

The operation is as follows: The machine receives its motion from outside through a driving pulley 116 fixed on one or the other end of the shaft 10 the rotation of which is transmitted to the grindstones 1 and 2 through the wheels 9 and 8 and the shafts 3 and 4. All the other parts of the machine are stationary for the time. The distance apart of the grindstones can be adjusted as hereinbefore stated by means of the two screws 23 actuated by the handwheels 30. To produce the alternating motion of the slide 36, the engaging lever 59 (Fig. 7) is depressed whereby the lever 58 is caused to lift the fork 56, 57, and through the medium of the shaft 55, the toothed sector 53 is pushed back. The latter which is always in engagement with the sleeve 52 (Fig. 1) rotating with the shaft 10, moves the sleeve 52 into engagement with the pinion 51 which in its turn is rotated so as to actuate the eccentric gear 44. The rotation of the latter produces through the medium of the eccentric, the slide 50 and the connecting rod 42, the alternating longitudinal motion of the slide 36 with a length of stroke that is determined by the setting of the eccentric. The blades are thus caused to travel to-and-fro between the two grindstones, the parts which are to constitute the cutting edges of the blades being turned upward. In order to produce the ascending movement of the slide 36, the lever 91 (Fig. 5) is raised whereby through the medium of the shaft 86 and the sector 85 in engagement with the sleeve 81 the latter is caused to engage the pinion 80 that is in engagement with the rack 84. The shaft 79 carrying the pinion 80 receives rotation from the wheel 44 through the medium of the following gearing: the worm 63, the wheel 64, the bevel pinions 68, 69, the stepped pulleys 70, 72, the shaft 73, the bevel pinions 74, 75, and the worm 77 and the toothed wheel 78. The rack 84 thus receives an ascending movement which is transmitted to the slide 36 and all the parts depending thereon. When the machine has been adjusted and is ready to work, the rollers 27 bear on the hollowest portion of the cavities 34. During the alternating and ascending movement the guides 33 travel between the rollers 27 also with an alternating and ascending movement, so that the position of these rollers is changed continually by the prominences of the guides which keep them apart as well as by the action of the counterweights 21 which have a tendency to move them toward each other. These oscillatory movements are transmitted in their entirety to the sliding carriages and consequently to the grindstones. The distance between these latter is therefore automatically controlled by the parts 33 which must also be varied according to the shape of the blade to be ground. Consequently the grindstones are moved apart more and more according as the blade rises and the distance between the two increases when the heel of the blade has been ground and then diminishes for grinding the point of the blade. At the moment when the engaging lever 91 was lifted the rod 93 was pushed back, thus allowing the rod 94 to fall back in front of the rod 93. Since in the meantime the lug 87 has compressed the rubber block 89, the latter acting as a spring keeps the rod 93 pressed against the rear face of the rod 94 so that the sleeve 81 remains in engagement with the pinion 80. During the ascending movement of the slide the rod 94 rises and slides in front of the rod 93, and when the lower end of the rod 94 reaches the level of the upper edge of the rod 93, the latter is pushed forward by the compression of the rubber block, with the result that the sector 84 is moved in the reverse direction to the movement it has received from the engaging lever 91, and thus disengages the pinion 80 from the sleeve 81. At this moment since the rack 84 no longer finds a support in the pinion 80, it falls back together with the slide 36 and the parts depending thereon. The shock produced by this fall is moderated by a counterweight 117 (Fig. 1) hung on a chain 118 passing over two pulleys 119, 119 (Fig. 9) fixed to the framing of the machine. This chain 118 is attached at its other end to a suitable projection 120 provided on the upright 40 (Fig. 3). At the moment of disengagement just described the engaging lever 91 has fallen back into the position shown in Fig. 5, and if it is desired to produce again the ascending movement of the slide 36, this lever 91 must be lifted again. The engaging lever 59 is raised to stop the alternating motion of the slide 26. The wheel 44 is provided with a weight 121 (Fig. 6) which causes this wheel, when free, to come to rest always in one and the same position which is such that the blade-clamping device is situated as far as possible from the grindstone for the purpose of facilitating the placing into position and the removal of the blades to be ground. When two blades have been ground on one side only, the grinding has removed from the blades a certain quantity of metal which is missing when these blades are turned for the purpose of grinding their other side. It is therefore necessary to have for each shape of blade two parts 101, one for the blades when quite rough, and another slightly thicker for blades ground on one side only.

The machine may be employed in a very simple manner for shaping its own guides. In other words, by arranging in the machine in the place of the guides 33, 34, a blade of the shape to be reproduced, and placing rough guides in the usual places of the blades which are to be ground, the grindstones will grind the said guides to the shape and thickness corresponding to that of the blade that has been temporarily placed in the machine, so that it is possible to reproduce indefinitely blades identically similar to the one that has served as a pattern.

The machine may be employed for grinding the rough blades of knives of all kinds, sword blades, razors, pocket knives, surgical instruments, and generally all instruments having cutting blades.

What I claim is:

1. A machine of the class described, comprising a frame and two grindstones mounted on sliding carriages 7 traveling on the framing of the machine, and adjustable as to position by means of an arrangement of screws 16, 23 and handwheels 22, 30, the said grindstones being driven independently by two bevel wheels 8, 9 of which one, 9, is movable along the main shaft 10 of the machine, for the purpose of adjusting the distance between the grindstones and the position of each grindstone and of controlling their movements independently of each other and also independently of all the other movable parts of the machine.

2. The mechanism for producing the horizontal alternating movement of the slide 36 carrying the blade-clamping devices, comprising a toothed wheel 44 engaging with a pinion 51 that is normally loose on the main shaft 10 of the machine, but is capable of being engaged with a sleeve 52 rotating with the shaft and slidable along the same, said sleeve being engaged with a toothed sector 53 whose positions of engagement and disengagement are controlled by an engaging lever 59 through the medium of a fork 56, 57.

3. In a machine of the class described, a mechanism for limiting the ascending movement of the slide carrying the blade clamping device, comprising an engaging lever 91 on the axle of which there are mounted a small lug 87 bearing upon a rubber block, and a rod 93 bearing for a length corresponding to the height of the blade to be ground, against another rod 94 that is movable vertically with the slide, the arrangement being such that when the two rods 93, 94 are no longer one in front of the other, the lower rod 93 is pushed forward by the compressed rubber block, with the result that the pinion driving the rack that raises the slide is disengaged from its shaft, and the slide and the parts depending thereon are caused to fall.

4. In a machine of the class described, a blade-clamping device, comprising a double table-plate 97, 98, the part 98 of which carries a guiding strip 101 of suitable profile against the two opposite faces of which two blades to be ground at one and the same time are pressed by means of clamps 106 of variable slope and by a central pressure cone 109.

5. A machine of the class described comprising a pair of abrading members, means for rotating said abrading members, reciprocating carriages for supporting said abrading members, means for adjusting said carriages forwardly from each other in order to cause said abrading members to approach and recede from each other, a sliding member for supporting an article to be abraded, and means for moving said sliding member transversely to its sliding movement.

6. A machine of the class described comprising a pair of abrading members, a sliding support for supporting an article to be abraded, means for moving said support in one direction, and means for moving said support in a direction normal to said first movement, said last mentioned means including a rack connected with said sliding support, a pinion meshing with said rack, means for driving said pinion, and means for throwing said pinion into and out of clutch.

7. A machine of the class described comprising a pair of revolving and abrading members, a carriage for supporting each of said abrading members, an adjusting screw associated with each of said carriages for adjusting the same toward and from each other, a power shaft, means splined to said power shaft and associated with said abrading members for rotating the same regardless of the position of said carriages, and means for moving an article to be abraded to a position substantially central of said abrading members.

In testimony whereof I have hereunto placed my hand at Lyon, this 10th day of March, 1913.

PIERRE PEROGNAT.

In the presence of two witnesses:
ALEXANDRE FORTUNE VALLES,
CLAUDE FERRAND.

Copies of this patent may be obtained for five cents each, by addressing the "Commissioner of Patents, Washington, D. C."